United States Patent
Jones

(10) Patent No.: US 6,464,517 B1
(45) Date of Patent: Oct. 15, 2002

(54) GBIC HAVING SPRING-MOUNTED SHIELDING DOOR

(75) Inventor: Dennis B. Jones, Orange City, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/996,478

(22) Filed: Nov. 27, 2001

(51) Int. Cl.[7] .............................................. H01R 13/44
(52) U.S. Cl. ..................... 439/138; 439/76.1; 439/607; 385/92
(58) Field of Search ................................ 439/138, 607, 439/76.1, 153, 137, 136; 385/92, 88, 89; 361/752, 756, 802

(56) References Cited

U.S. PATENT DOCUMENTS

| | | | | |
|---|---|---|---|---|
| 4,176,897 A | * | 12/1979 | Cameron | 439/138 |
| 4,847,711 A | * | 7/1989 | Inoue | 439/138 |
| 5,546,281 A | * | 8/1996 | Poplawski et al. | |
| 5,717,533 A | * | 2/1998 | Poplawski et al. | |
| 5,734,558 A | * | 3/1998 | Poplawski et al. | |
| 5,879,173 A | * | 3/1999 | Poplawski et al. | 439/138 |
| 5,964,600 A | * | 10/1999 | Miles et al. | 439/138 |
| 6,095,862 A | * | 8/2000 | Doye et al. | 439/138 |
| 6,302,737 B1 | * | 10/2001 | Billman | 439/138 |
| 6,305,955 B1 | * | 10/2001 | Billman | 439/138 |

* cited by examiner

Primary Examiner—Gary F. Paumen
(74) Attorney, Agent, or Firm—Wei Te Chung

(57) ABSTRACT

A giga-bit interface converter (GBIC) includes a base (1) and a revertible shielding door (2) pivotably positioned in a front of the base. A post (24) is formed on a rear of the shielding door, and a block (14) is formed on the base. A spring beam (23) has an arcuate front end (232) and a rear end (231). The rear end is fixed on the block, and the front end sits on the post. When a complementary plug connector (27) is inserted into the GBIC, the front end of the spring beam is deformably pushed upwardly by the post. A spring force is thereby generated in the spring beam, which exerts a downward force on the post. When the plug connector is withdrawn from the GBIC, the spring force of the spring beam pushes the post down. This causes the shielding door to rotatingly return to its original position.

1 Claim, 8 Drawing Sheets

GBIC HAVING SPRING-MOUNTED SHIELDING DOOR

BACKGROUND OF THE INVENTION

1. Field of the Invention

The present invention relates to a giga-bit interface converters (GBICs), and particularly to GBICs having shielding doors to protect a user's eyes from harm when a mating plug is withdrawn from the GBIC.

2. Description of Related Art

GBICs are widely used for bidirectional transmission of data between an electrical interface and an optical data link. A GBIC receives electrically encoded data signals, converts them into optical signals, and transmits the optical signals over the optical data link. The GBIC also receives optically encoded data signals, converts them into electrical signals, and transmits the electrical signals onto the electrical interface.

Transmission and receipt of optically encoded data signals are typically performed by a laser diode and a photo diode encased within the GBIC. Photo signals emitted from the laser diode are harmful to human eyes. Therefore, a typical GBIC has a shielding door to protect a user's eyes when a mating plug is withdrawn from the GBIC.

Presently, two kinds of shielding door configurations are commonplace. In the first configuration, the shielding door returns to a closed position with the aid of a spring. In the second configuration, the shielding door returns to a closed position due to the resilient nature of the door itself.

U.S. Pat. No. 5,879,173 discloses a GBIC with a shielding door having the abovementioned first configuration. A spring such as a torsion spring is mounted on a pivotable post of the shielding door. The spring resiliently returns the shielding door to a closed position parallel to a front face of a receptacle of the GBIC. Unfortunately, the spring is prone to fall out of position, particularly after repeated opening and closing of the shielding door.

A GBIC with a shielding door having the abovementioned second configuration solves the above problem of the first configuration. The GBIC comprises a base having a bottom plate, and two side walls extending upwardly from the bottom plate. A revertible shielding door is pivotably positioned in a front face of the base, and remains perpendicular to the bottom plate. A spring arm extends from one end of the shielding door, and is fixed to an intermediate portion of the base. When the shielding door is pivoted to be parallel to the bottom plate, the spring arm is resiliently deformed. The spring arm can therefore resiliently return the shielding door to its original position.

In the above-described second configuration of the shielding door, the spring arm is a part of the shielding door. This makes the structure of the shielding door unduly complicated. Furthermore, the spring arm is prone to break at a point where it interconnects with the shielding door, particularly after it has become fatigued from repeated use. The shielding door is thus easily damaged, and needs frequent replacement.

SUMMARY OF THE INVENTION

In view of the above-described drawbacks of the related art, an object of the present invention is to provide a GBIC having a durable shielding door.

A further object of the present invention is to provide a GBIC having a shielding door with a the spring that reliably remains in correct position even after repeated use.

In order to achieve the objects set above, a GBIC in accordance with the present invention comprises a base having a bottom plate and two side walls extending upwardly from the bottom plate. A revertible shielding door is pivotably positioned in a front of the base, and remains perpendicular to the bottom plate. A post is formed on a rear side of the shielding door, and a block is formed on the base. A spring beam has an arcuate front end and a rear end. The rear end is fixed on the block, and the front end sits on the post of the shielding door. When a complementary plug connector is inserted into the GBIC, the front end of the spring beam is deformably pushed upwardly by the post. A spring force is thereby generated in the spring beam, which exerts a downward force on the post. When the plug connector is withdrawn from the GBIC, the spring force of the spring beam pushes the post down. This causes the shielding door to rotatingly return to its original position.

Other objects, advantages and novel features of the invention will become more apparent from the following detailed description when taken in conjunction with the accompanying drawings, in which:

DETAILED DESCRIPTION OF PREFERRED EMBODIMENTS OF THE INVENTION

Figure 1:
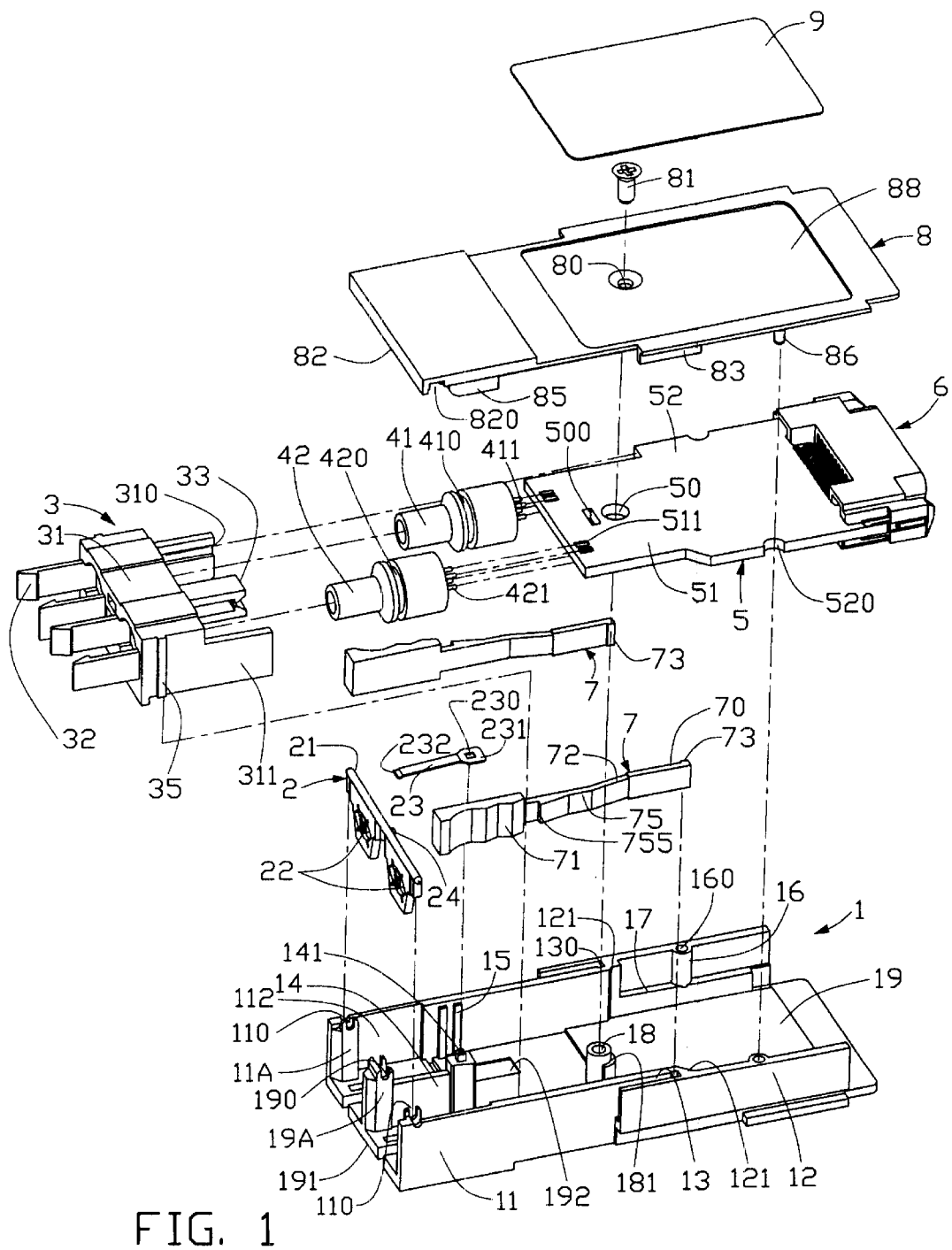
FIG. 1 is an exploded view of a GBIC in accordance with the present invention, together with a tape.
Figure 2:
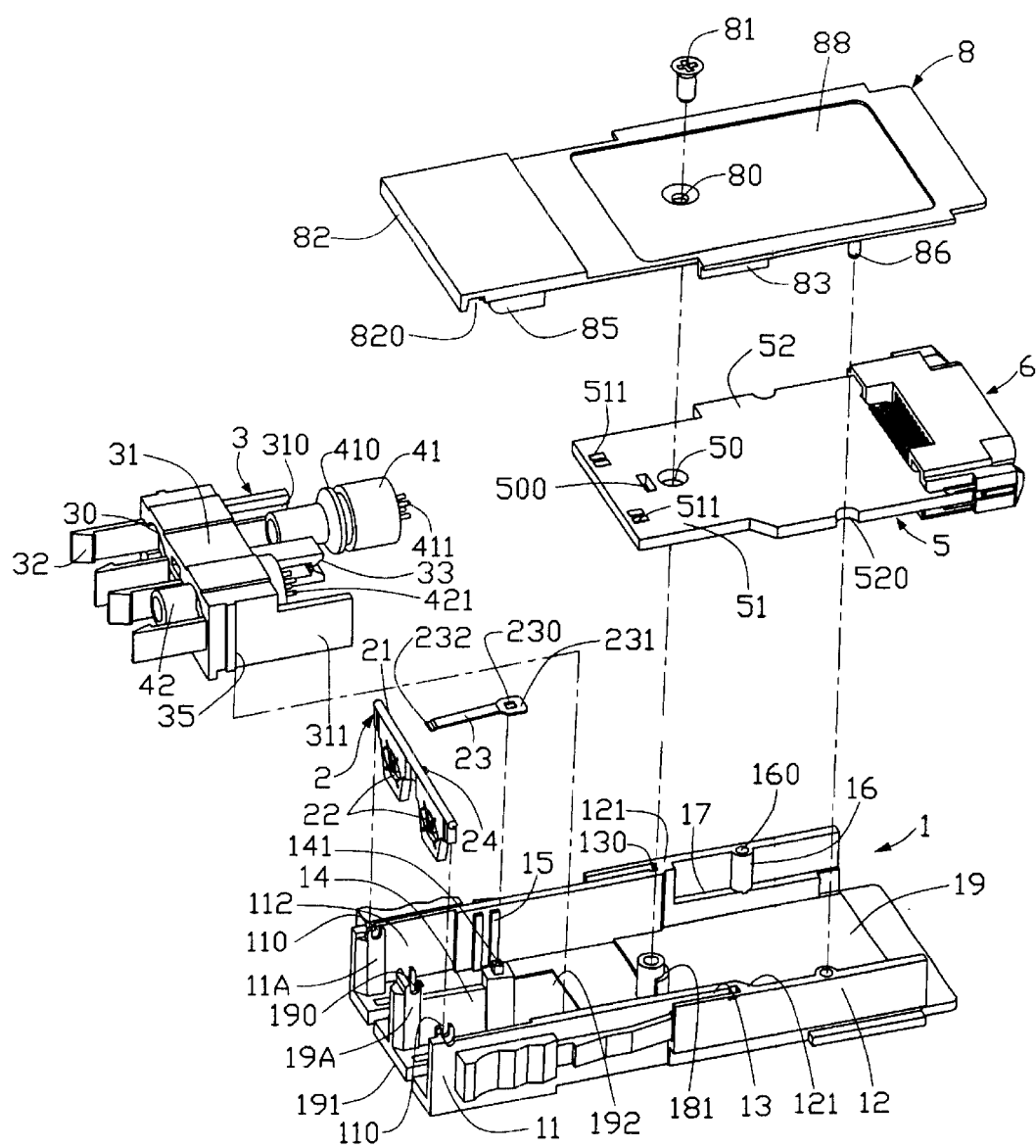
FIG. 2 is a partly assembled view of the GBIC of FIG. 1.
Figure 3:
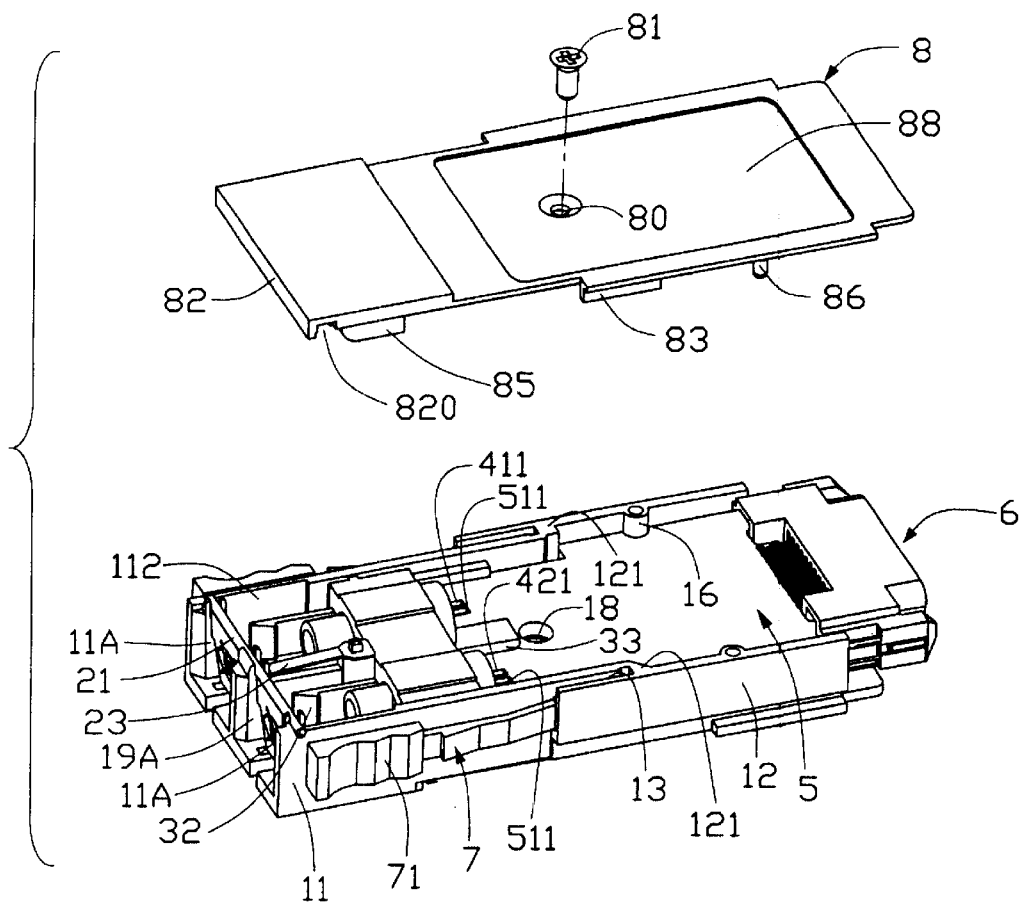
FIG. 3 is a more fully assembled view of the GBIC of FIG. 1.

Referring to FIGS. 1 and 2, a giga-bit interface converter (GBIC) in accordance with the present invention comprises a base 1, a shielding door 2 pivotally fixed to the base 1, an interconnection bracket 3 detachably fixed to the base 1, a printed circuit board 5 fixed to the interconnection bracket 3 and firmly positioned in the base 1, a pair of resilient latches 7 fixed to two opposite sides of the base 1, and a cover 8 detachably mounted on the base 1.

The base 1 has a bottom plate 19, a pair of forward side walls 11 extending from opposite sides of the bottom plate 19 respectively, and a pair of rearward side walls 12 extending from the opposite sides of the bottom plate 19 respectively. Each forward side wall 11 is connected with its proximate rearward side wall 12 by an interconnection wall 121.

A reception socket 13 is defined between each forward side wall 11 and its proximate rearward side wall 12, where the said forward and rearward side walls 11, 12 overlap. Each reception socket 13 is exposed to an exterior of the base 1 at top and front extremities of the reception socket 13. A cutout 130 is defined in a junction of each interconnection wall 121 and its adjacent forward side wall 11. Each cutout 130 is in communication with a rear of its adjacent reception socket 13.

A block 14 extends upwardly from a middle portion of the bottom plate 19. A four-sided positioning post 141 extends upwardly from the block 14. A pair of parallel positioning ribs 15 is formed on an inner surface of each forward side wall 11. Each pair of positioning ribs 15 on one forward side wall 11 opposes the other pair of positioning ribs 15 on the opposite forward side wall 11.

A boss 16 is formed on an inner surface of each rearward side wall 12, and a vertical hole 160 is defined in each boss 16. A horizontal positioning step 17 is formed on an inside of each rearward side wall 12, on opposite sides of a bottom extremity of the corresponding boss 16. A hollow post 18 extends upwardly from a middle portion of the bottom plate 19. An arcuate peripheral seat 181 is formed adjacent a peripheral portion of the hollow post 18. A front central support 19A is formed on the bottom plate 19 near a front edge 191 of the bottom plate 19. Two forward side supports 11 A are formed at opposite sides of a front portion of the bottom plate 19. Each forward side support 11A is integrally joined with an inner surface of its adjacent forward side wall 11. A pivot cutout 190 is defined in a top of the front central support 19A. A pivot cutout 110 is defined in a top of each forward side support 11A. The pivot cutouts 190, 110 are all aligned with one another. A positioning space 112 is defined in the inner surface of each forward side wall 11, between the forward side support 11A and the positioning ribs 15. Two shallow recesses 192 (only one shown) are defined in the bottom plate 19, generally between the opposing pairs of positioning ribs 15.

The door 2 comprises a pivot 21 for being pivotably held in the pivot cutouts 110, 190 of the forward side supports 11A and front central support 19A. The door 2 has two shielding plates 22 extending from the pivot 21. The shielding plates 22 are coplanar with each other. A post or projection 24 is formed on a rear side of the shielding door 2 near a middle of the pivot 21. A spring beam 23 is provided for the door 2. The spring beam 23 has a rear end 231 and a front end 232. The rear end 231 has a square hole 230 defined therein. The front end 232 has an arcuate profile.

Figure 4A:
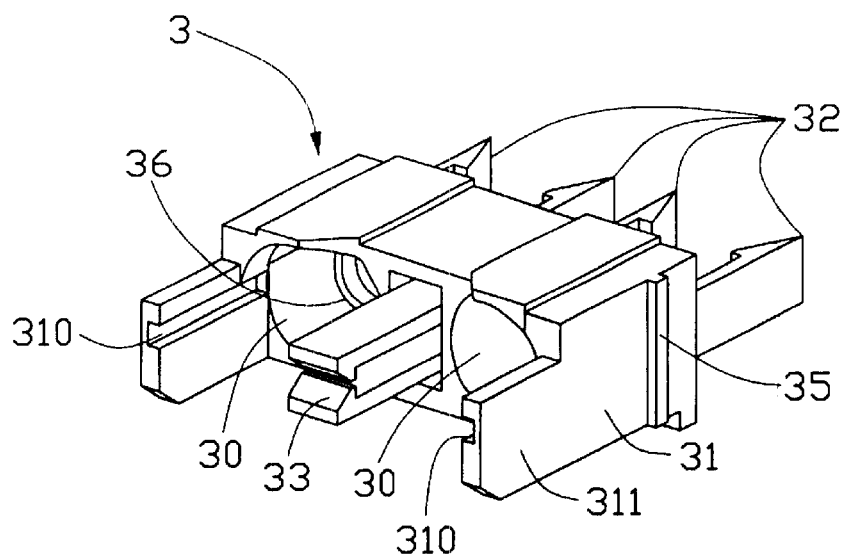
FIG. 4A is a perspective view of an interconnection bracket of the GBIC of FIG. 1, but viewed from another aspect.

Also referring to FIG. 4A, the interconnection bracket 3 comprises a housing 31. Two cavities 30 are defined in the housing 31, for respectively receiving a photo diode 41 and a laser diode 42. Each cavity 30 has a shoulder 36, for abutting against the corresponding diode 41, 42 fully inserted into the cavity 30. The photo diode 41 and the laser diode 42 have similar configurations. Each diode 41, 42 respectively has an annular groove 410, 420 defined in a periphery thereof. Each diode 41, 42 respectively has conductive leads 411, 421 extending from a rear face thereof. The housing 31 has two pairs of spring hooks 32 extending from a front face thereof, and two rear plates 311 extending from opposite sides of a rear face thereof. Each rear plate 311 defines a horizontal channel 310 in an inner surface thereof. A pair of retention hooks 33 extends from a middle of the rear face of the housing 31. A rib 35 is formed on each of opposite sides of the housing 31, for engaging between the positioning ribs 15 on the corresponding forward side wall 11 of the base 1.

Figure 4B:
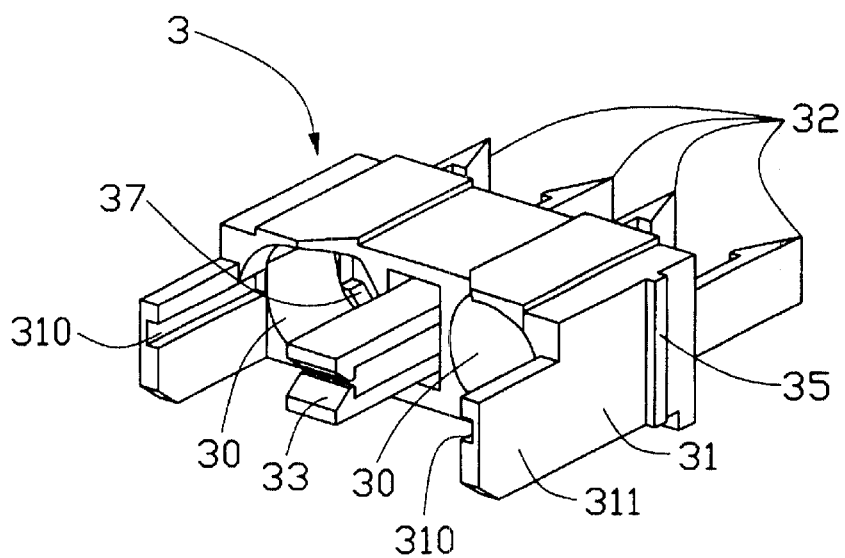
FIG. 4B is similar to FIG. 4A, but showing an alternative embodiment of the interconnection bracket of the GBIC of FIG. 1.

FIG. 4B shows an alternative embodiment of the interconnection bracket 3. Most of the structure of the alternative embodiment is identical to that of the preferred embodiment shown in FIG. 4A. However, instead of having shoulders 36, two protrusions 37 are formed at a rear portion of each cavity 30, for engaging in the corresponding annular grooves 410, 420 of the diodes 41, 42. The addition of the protrusions 37 enables the diodes 41, 42 to be more securely retained in the cavities 30 of the interconnection bracket 3.

The printed circuit board 5 comprises a narrow front section 51 and a wide rear section 52. Solder pads 511 are formed on a top surface of the printed circuit board 5 near a front edge thereof, for soldering to the conductive leads 411, 421 of the photo and laser diodes 41, 42. A hole 500 is defined in the front section 51, for engagingly receiving the retention hooks 33 of the interconnection bracket 3. A fixing bore 50 is defined in back of the hole 500, for fittingly receiving the hollow post 18 of the base 1. Two semi-circular cutouts 520 are defined in opposite side edges of the rear section 52 respectively, for engagingly receiving the bosses 16 of the base 1. A rear connector 6 such as an SCA2 connector is connected to a rear edge of the printed circuit board 5, by straddle mount soldering.

Each resilient latch 7 has a retention section 70 at a rear end thereof. The retention section 70 has a hook end 73 at a rear end thereof, for engaging in the cutout 130 of the corresponding reception socket 13 of the base 1. A bent-out section 72 integrally extends from a front end of the retention section 70, at a slight angle offset from a plane of the retention section 70. An engagement section 75 integrally extends from a front end of the bent-out section 72, and parallel to the retention section 70. The engagement section 75 has a ratchet tooth 755 formed thereon, for engaging in a slot of an external guide rail (not shown) of a device which receives the GBIC therein. A handle section 71 integrally extends from a front end of the engagement section 75. A series of ridges is formed on the handle section 71, for facilitating manual operation of the resilient latch 7.

Figure 4C:
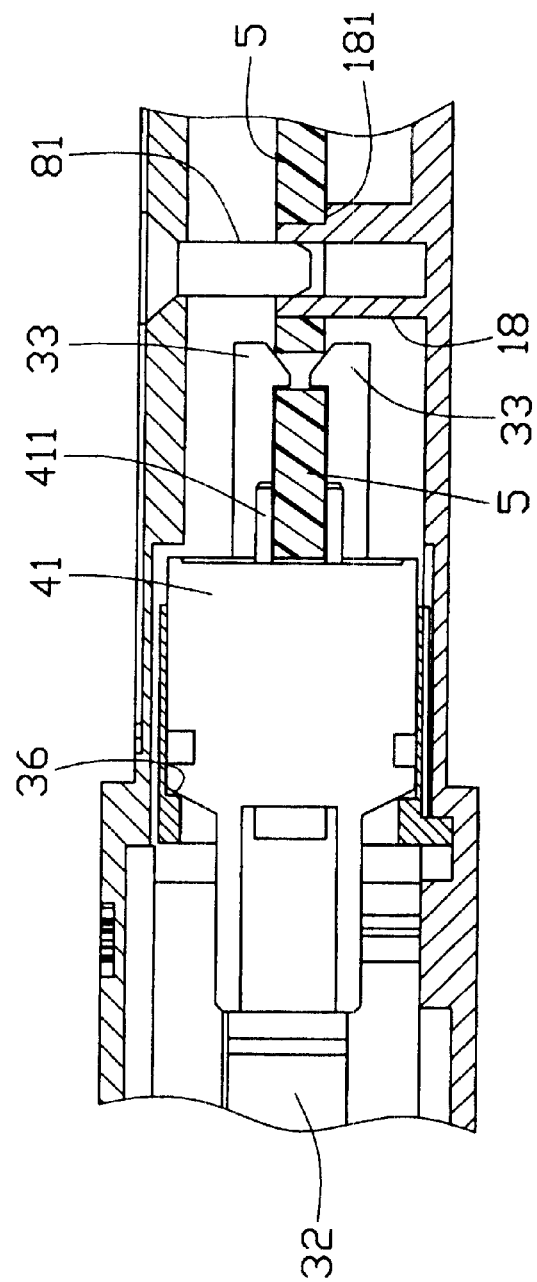
FIG. 4C is a schematic cross-sectional view of a portion of the GBIC of FIG. 1 fully assembled.

The cover 8 is a metal plate having a shallow depression 88 formed in a middle portion of a top face thereof. A hole 80 defined in the depression 88, for extension of a screw 81 therethrough to threadedly engage with the hollow post 18 of the base 1 (see FIG. 4C). The cover 8 has a cap 82 at a front end thereof, for abutting the forward side supports 11A and the front central support 19A of the base 1. A transverse reception groove 820 is defined in a bottom surface of the cover 8 behind the cap 82, for rotatably receiving the pivot 21 of the shielding door 2. A pair of posts 86 (only one visible) depends from opposite sides of a rear portion of the cover 8 respectively, for being inserted into the vertical holes 160 of the bosses 16 of the base 1. A pair of middle flanges 83 (only one visible) depends from opposite sides of the cover 8 respectively, for being retained in the reception sockets 13 of the base 1. A pair of front flanges 85 (only one visible) depends from the opposite sides of the cover 8 respectively, for being retained in the positioning spaces 112 of the base 1. A tape 9 is sized to correspond to an area of the depression 88 of the cover 8.

In assembly, the photo and laser diodes 41, 42 are firstly fixedly inserted into the cavities 30 of the interconnection bracket 3. The photo and laser diodes 41, 42 are then rotated until the conductive leads 411, 421 thereof are oriented such that they are ready to be soldered to the printed circuit board 5. For the alternative embodiment of the interconnection bracket 3 shown in FIG. 4B, when the photo and laser diodes 41, 42 are inserted into the cavities 30, they are snapped into place. That is, the protrusions 37 of the interconnection bracket 3 are engaged in the annular grooves 410, 420 of the photo and laser diodes 41, 42.

The printed circuit board 5 is then attached to the interconnection bracket 3. The hole 500 of the printed circuit board 5 snappingly receives the retention hooks 33 of the interconnection bracket 3. The conductive leads 411, 421 are in contact with the solder pads 511 of the printed circuit board 5. The conductive leads 411, 421 are soldered to the solder pads 511. The combined printed circuit board 5 and interconnection bracket 3 is put into the base 1. The ribs 35 of the interconnection bracket 3 are retained between corresponding ribs 15 of the base 1. A lower portion of each photo and laser diode 41, 42 is seated in a corresponding shallow recess 192 of the base 1. The fixing bore 50 of the printed circuit board 5 fitting receives the hollow post 18 of the base 1. A portion of a bottom of the printed circuit board 5 around the bore 50 is seated on the peripheral seat 181 of the base 1 (see especially FIG. 4C). The cutouts 520 of the printed circuit board 5 engagingly receive the bosses 16 of the base 1. The rear section 52 of the printed circuit board 5 is seated on the positioning steps 17 of the base 1.

The shielding door 2 is then attached to the base 1. The pivot 21 of the shielding door 2 is placed in the pivot cutouts 110, 190 of the base 1. Each shielding plate 22 of the shielding door 2 is located between the front central support 19A and a corresponding forward side support 11A. The positioning post 141 of the block 14 is fittingly received in the four-sided hole 230 of the spring beam 23 of the shielding door 2. The front end 232 of the spring beam 23 sits on the post 24 of the shielding door 2. The retention sections 70 of the resilient latches 7 are then inserted into the reception sockets 13 of the base 1. The hook ends 73 of the resilient latches 7 are engagingly received in the cutouts 130 of the reception sockets 13. The cover 8 is then mounted on the base 1. The screw 81 is extended through the hole 80 of the cover 8 to threadedly engage with the hollow post 18 of the base 1. The posts 86 of the cover 8 are retained in the vertical holes 160 of the bosses 16 of the base 1. The middle flanges 83 of the cover 8 are received in the reception sockets 13 of the base 1, and contact the retention sections 70 of the corresponding resilient latches 7. The front flanges 85 of the cover 8 are retained in the positioning spaces 112 of the base 1. Finally, the tape 9 is attached on a top surface of the depression 88 of the cover 8.

Figure 5:
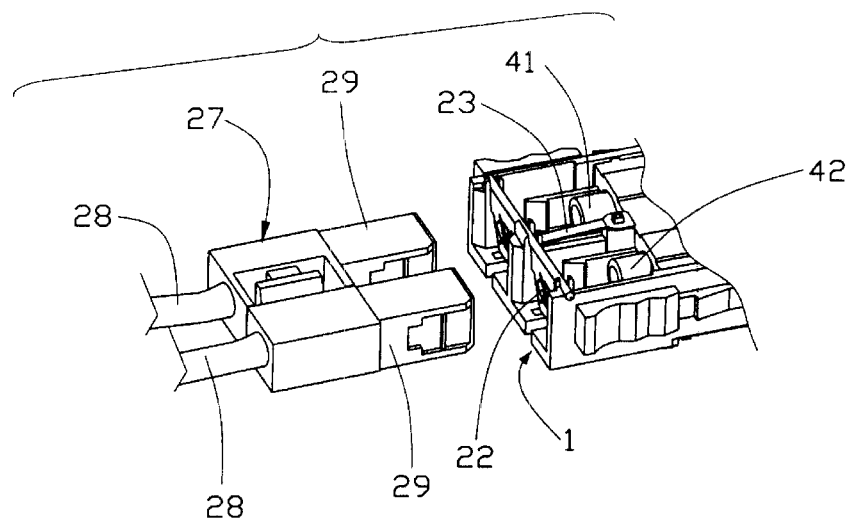
FIG. 5 is a view of part of the GBIC of FIG. 3, together with a complementary fiber connector to be plugged into the GBIC.
Figure 6:
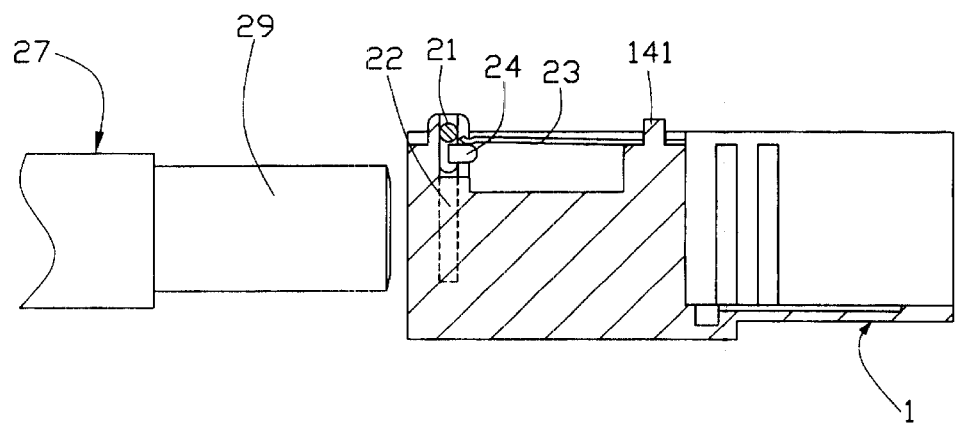
FIG. 6 is a schematic side sectional view of FIG. 5, showing a relation between a shielding plate and a spring beam of the GBIC.
Figure 7:
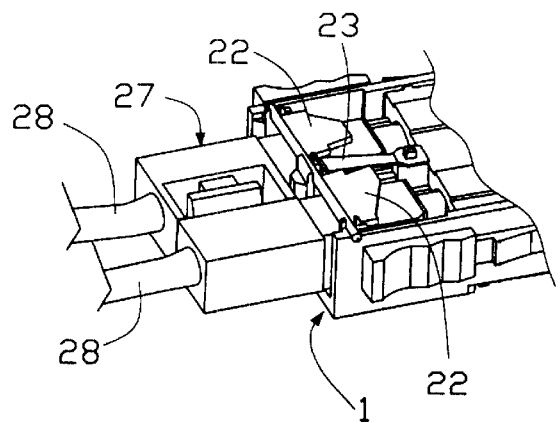
FIG. 7 is similar to FIG. 5, but showing the fiber connector plugged into the GBIC.
Figure 8:
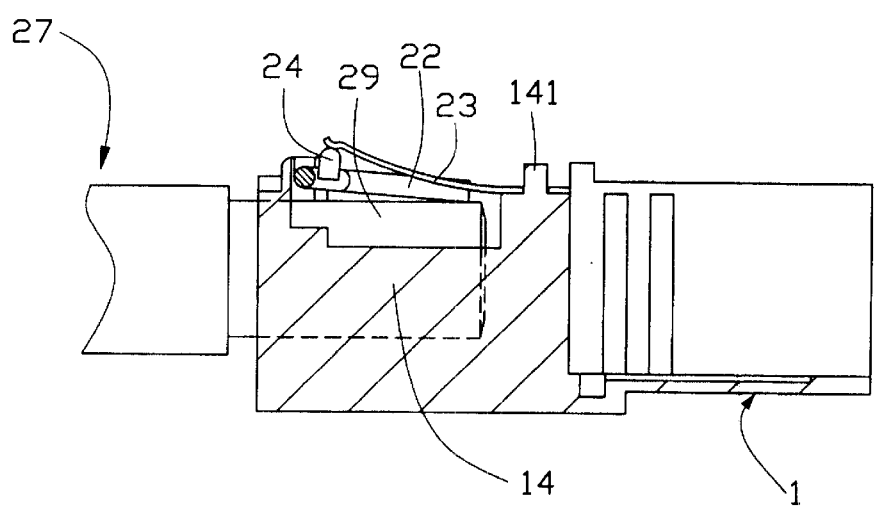
FIG. 8 is similar to FIG. 6, but showing the relation between the shielding plate and the spring beam after the fiber connector has been plugged into the GBIC.

FIGS. 5 through 8 show connection of a fiber connector 27 with the GBIC of the present invention. Referring particularly to FIGS. 5 and 6, the fiber connector 27 has two plugs 29 connected with two fiber cables 28. Before the fiber connector 27 is inserted into the GBIC, the shielding plates 22 are oriented normal to the base 1, and the spring beam 23 is generally flat. When the fiber connector 27 is inserted into the GBIC, the shielding plates 22 are forced to rotate substantially ninety degrees and thereby be oriented parallel to the base 1. An orientation of the post 24 accordingly changes from a horizontal orientation to a vertical orientation. Thus the front end 232 of the spring beam 23 is deformably pushed upwardly by the post 24. A spring force is thereby generated in the spring beam 23, which exerts a downward force on the post 24. When the fiber connector 27 is withdrawn from the GBIC, the spring force of the spring beam 23 pushes the post 24 down. This causes the shielding plates 22 to rotatingly return to their original normal orientation.

Figure 9:
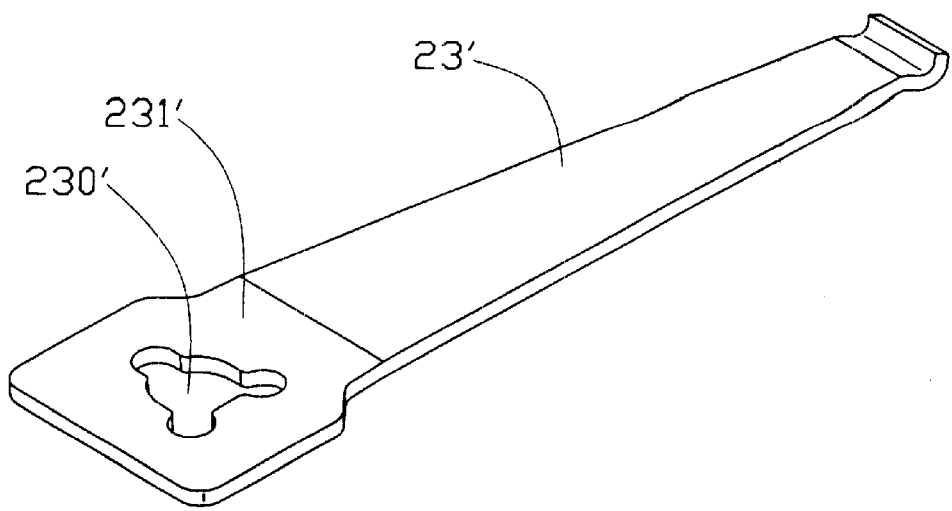
FIG. 9 is a perspective view of an alternative embodiment of the spring beam of the GBIC of FIG. 1.
Figure 10:
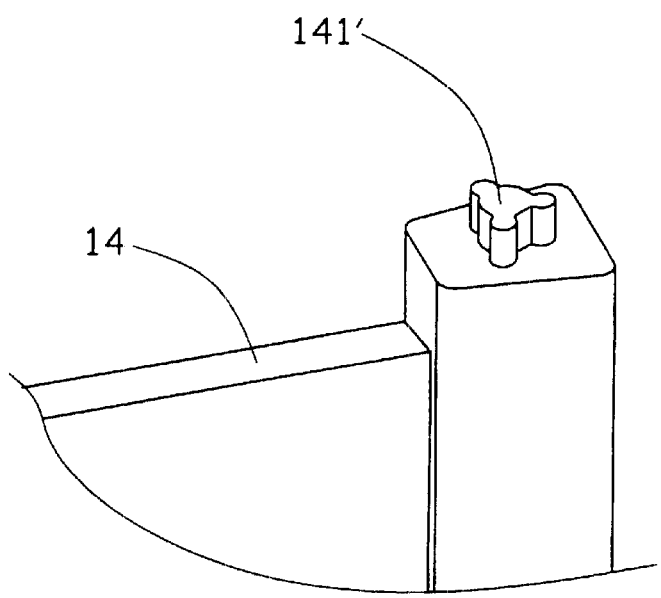
FIG. 10 is a perspective view of an alternative embodiment of a block of a base of the GBIC of FIG. 1.

FIG. 9 shows an alternative embodiment of the spring beam 23'. Most of the structure of the spring beam 23' is identical to the structure of the spring beam 23 of the preferred embodiment. However, the spring beam 23' has a floriated hole 230' in a rear end 231' thereof. Therefore, a floriated post 141' is formed on the block 14 of the base 1 (see FIG. 10). In assembly, the floriated post 141' is fittingly received in the floriated hole 230'. The spring beam 23' is therefore very securely mounted to the base 1.

While the present invention has been described with reference to a particular embodiment, the description is illustrative of the invention and is not to be construed as limiting the invention. Therefore, various modifications to the present invention can be made to the preferred embodiment by those skilled in the art without departing from the true spirit and scope of the invention as defined by the appended claims.

What is claimed is:

1. An opto-electronic interface converter comprising:

a base having at least one support located at a front section thereof, and a block located in rear of the at least one support;

a shielding door comprising a pivot pivotably mounted to the at least one support, a rearwardly extending post, and a spring beam, the spring beam having a front end sitting on the post and a rear end secured to the block;

an interconnection bracket mounted to the base and defining two cavities therein;

a photo diode and a laser diode respectively received in the cavities of the bracket, and adapted for connecting with an optical connector;

a printed circuit board electrically connecting with the photo diode and the laser diode; and an electrical connector electrically connecting with the printed circuit board;

wherein each of the supports defines a cutout in a top thereof, for rotatably receiving the pivot of the shielding door;

wherein the block has a positioning post extending upwardly therefrom, the rear end of the spring beam being secured to the positioning post;

wherein the positioning post has a four-sided configuration;

wherein the base has three supports located at the front section thereof, the three supports being aligned with one another, the pivot of the shielding door being pivotably mounted to the three supports, and wherein the shielding door has two shielding plates interleaved between the three supports, the two shielding plates being coplanar with each other;

wherein the post is formed at a rear side of the shielding door;

wherein the front end of the spring beam has an arcuate configuration;

wherein the positioning post has a floriated configuration;

wherein the photo and laser diodes each have a groove defined in an outer periphery thereof, the interconnection bracket forms at least one protrusion in each of the two cavities of the interconnection bracket, and each of the protrusions engages in a corresponding groove, wherein the interconnection bracket has a pair of rearwardly extending retention hooks fixedly engaging with the printed-circuit board.

* * * * *